Jan. 1, 1963  M. G. STEWART  3,071,383
COMPOSING MACHINE IMPROVEMENTS
Filed May 6, 1960  13 Sheets-Sheet 1

INVENTOR.
Merritt G. Stewart,
BY Parker & Carter
Attorneys.

INVENTOR.
Merritt G. Stewart,
BY Parker & Carter
Attorneys.

INVENTOR.
Merritt G. Stewart,
BY Parker & Carter
Attorneys.

Jan. 1, 1963  M. G. STEWART  3,071,383
COMPOSING MACHINE IMPROVEMENTS
Filed May 6, 1960  13 Sheets-Sheet 10
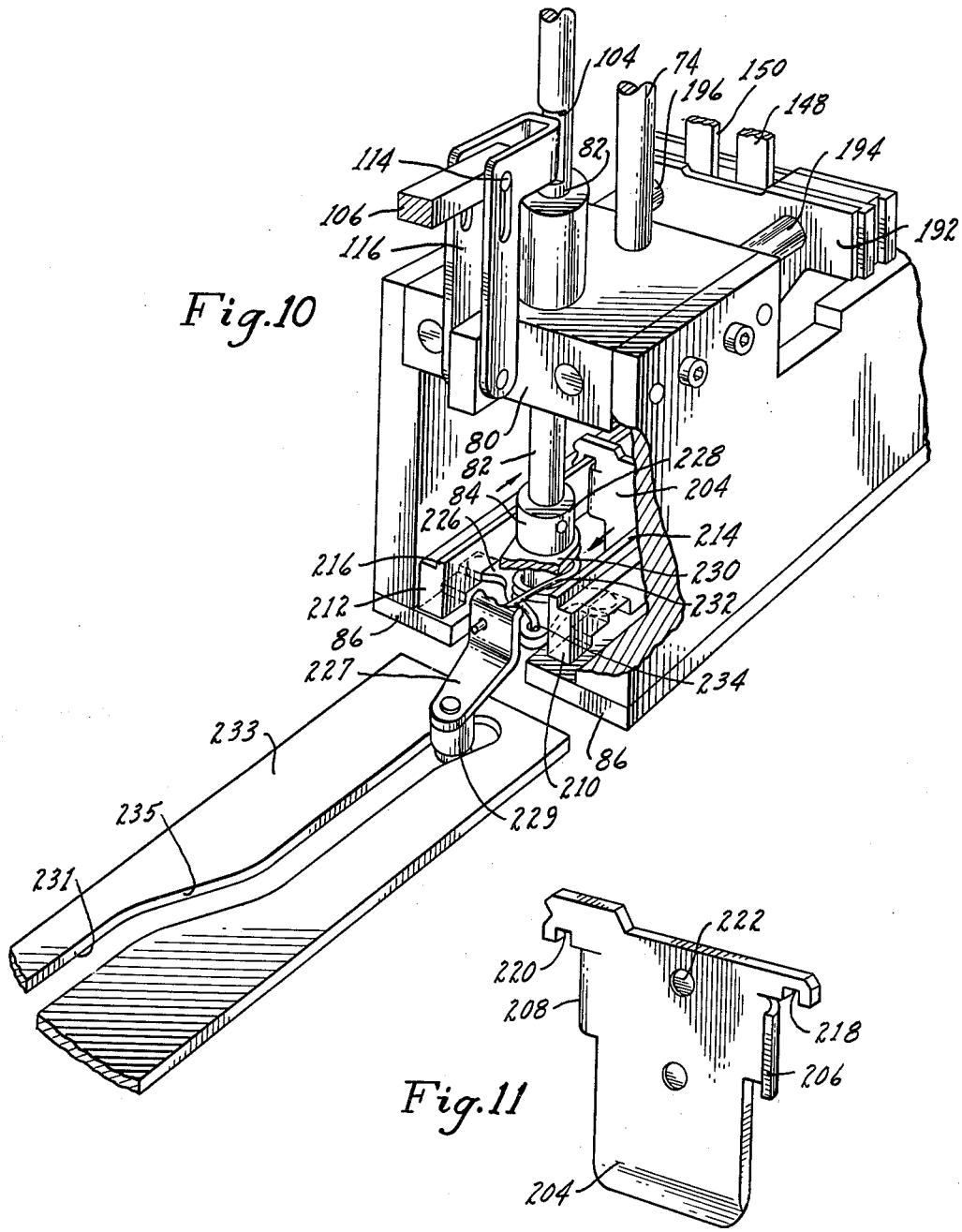
INVENTOR.
Merritt G. Stewart,
BY Parker & Carter
Attorneys.

INVENTOR.
Merritt G. Stewart,
BY Parker & Carter
Attorneys.

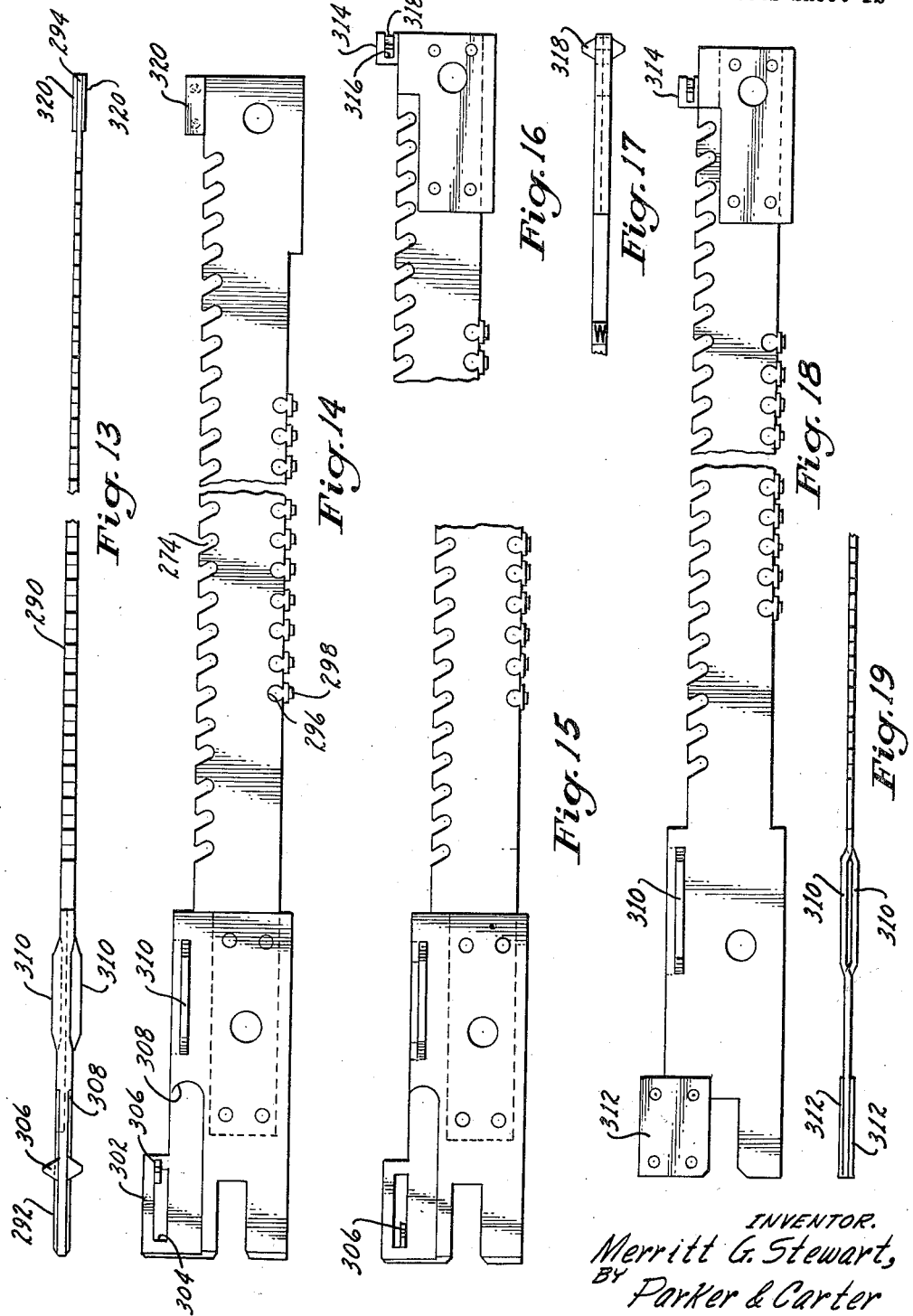

Jan. 1, 1963 M. G. STEWART 3,071,383
COMPOSING MACHINE IMPROVEMENTS
Filed May 6, 1960 13 Sheets-Sheet 13
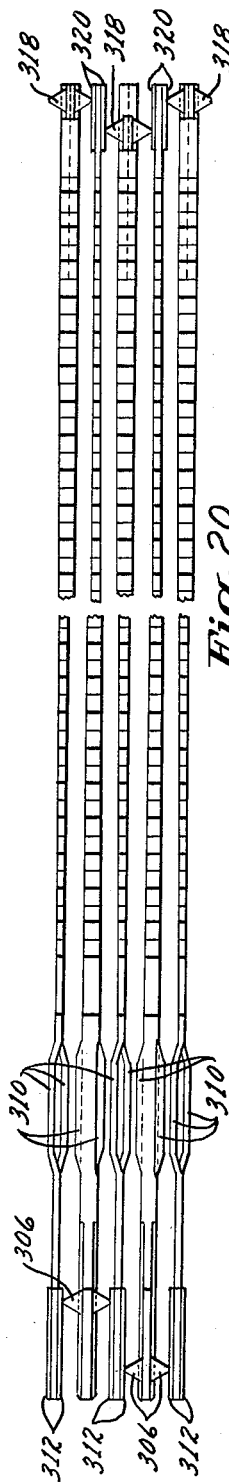
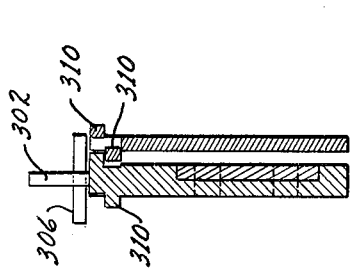
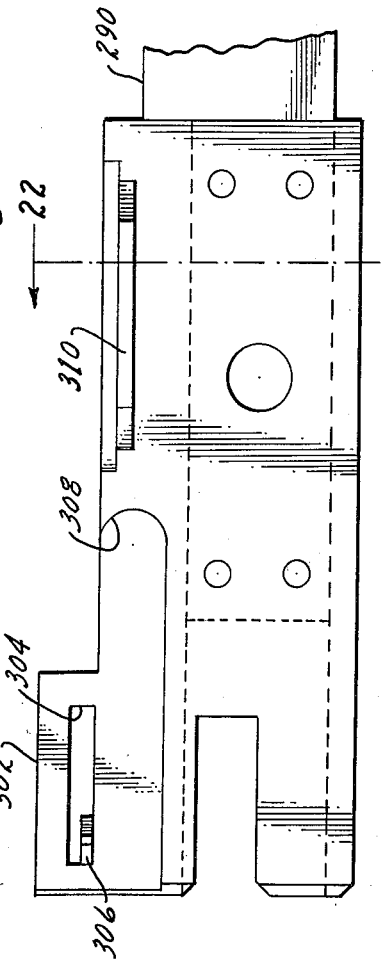
INVENTOR.
Merritt G. Stewart,
BY Parker & Carter
Attorneys.

United States Patent Office 3,071,383
Patented Jan. 1, 1963

3,071,383
COMPOSING MACHINE IMPROVEMENTS
Merritt G. Stewart, Chicago, Ill., assignor to Hadley, Inc., Chicago, Ill., a corporation of Illinois
Filed May 6, 1960, Ser. No. 27,385
20 Claims. (Cl. 276—8)

This invention relates to composing machines and in particular to an improved justifying means therefor.

One purpose of this invention is an improved justifying means for use on a composing machine utilizing tapered longitudinal type bars.

Another purpose is a composing machine of the type described utilizing an improved justifier for accurately spacing a printed line.

Another purpose is an improved longitudinal tapered type bar suitable for use in a composing machine of the type described.

Another purpose is an improved justifying means suitable for use with longitudinal tapered type bars and including individual justifier members which may be positioned between each preselected type bar, twisting of the individual justifiers serving to accurately position the words to be printed.

Another purpose is to provide longitudinal tapered type bars suitable for use on a composing machine of the type described and having means effective to return the justifiers to normal position after a particular line has been either printed or cast.

Another purpose is to provide an improved justifier drive for use on a composing machine of the type described.

Other purposes will appear in the ensuing specification, drawings and claims.

Figure 1:
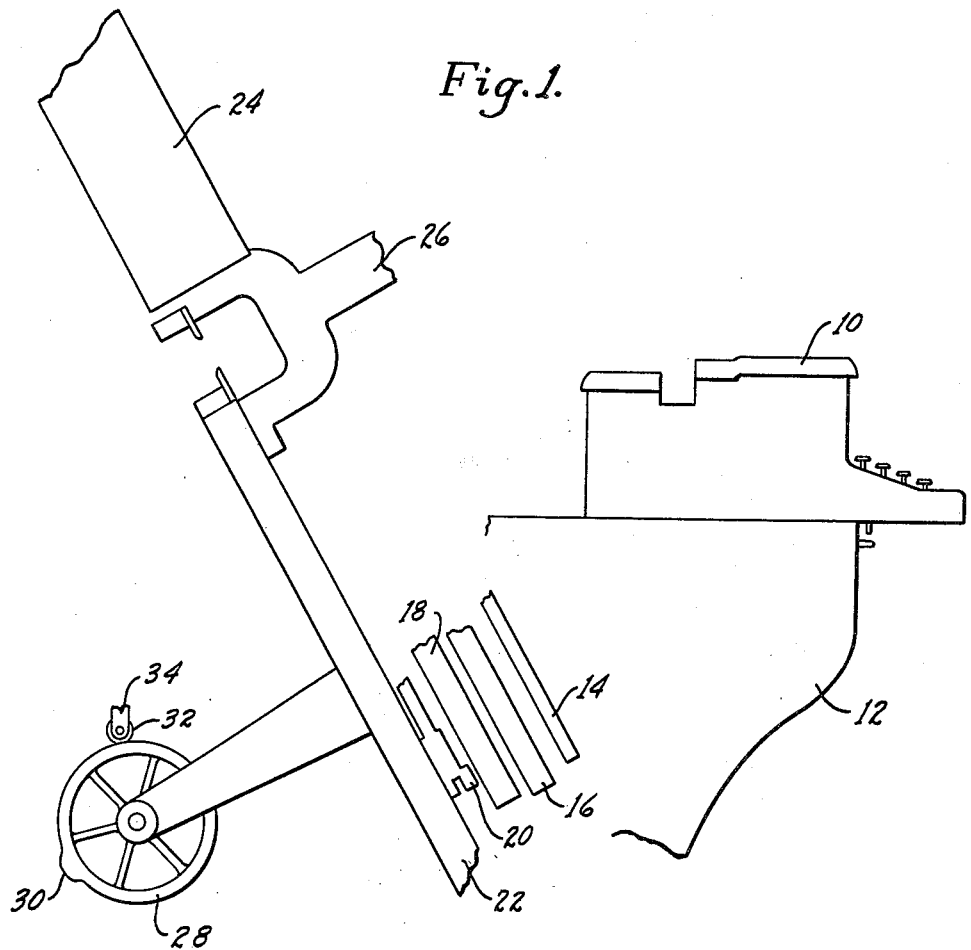
Figure 2:
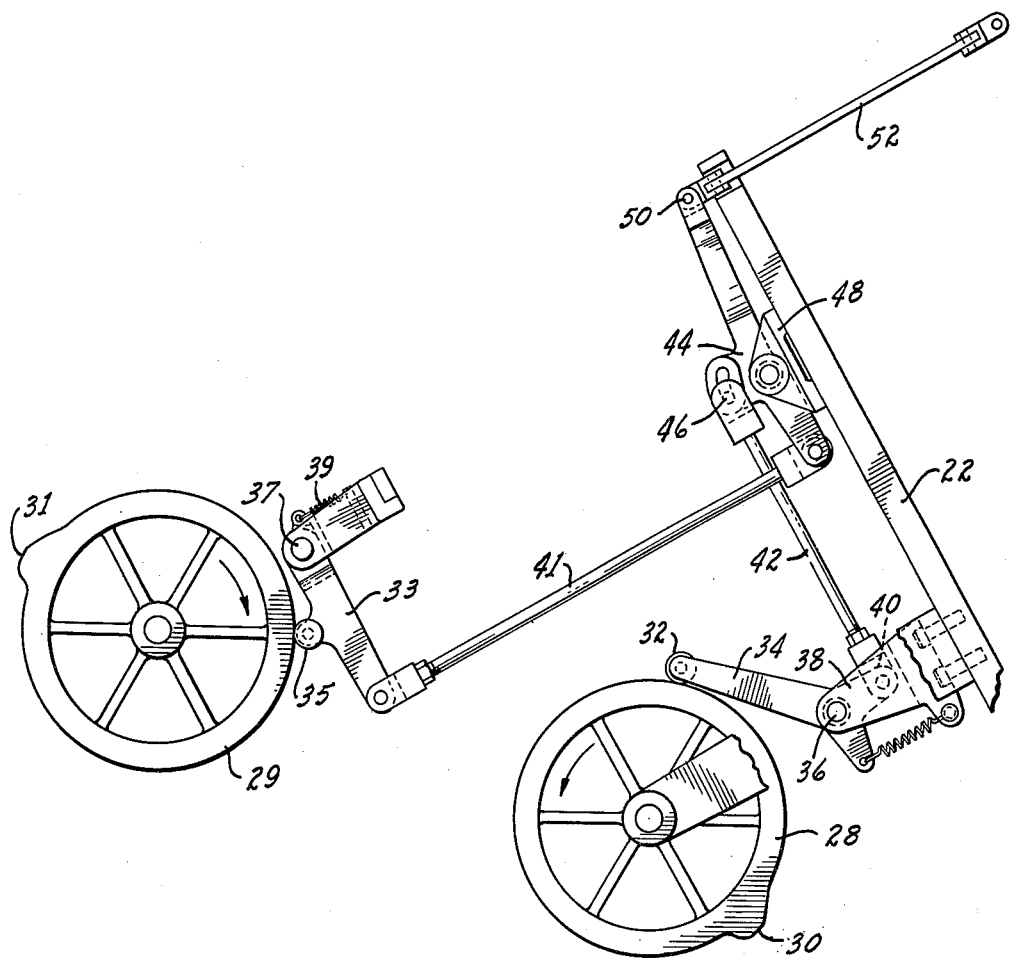
Figure 3:
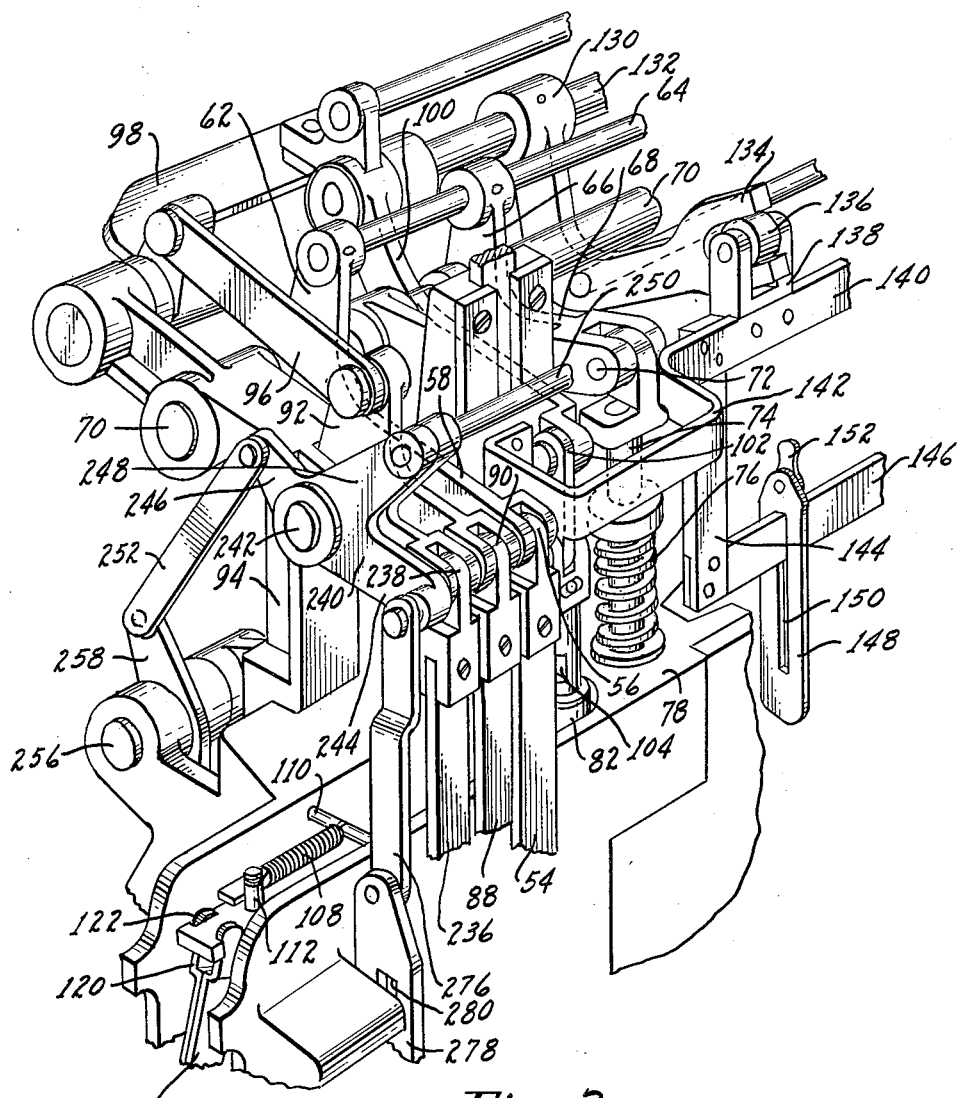
Figure 4:
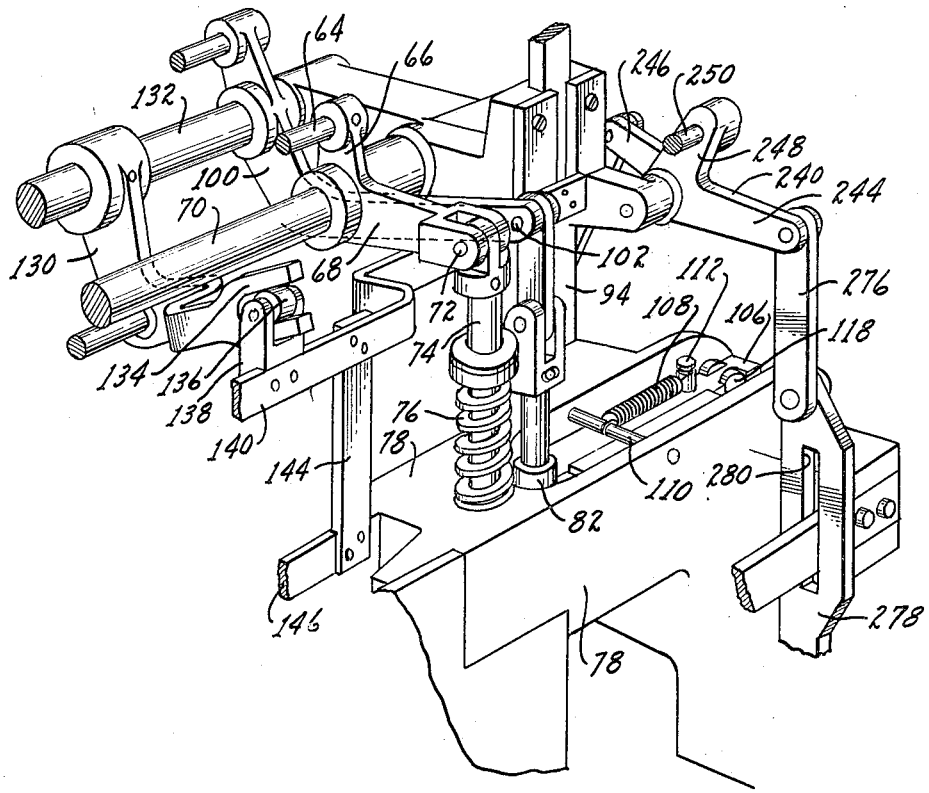
Figure 5:
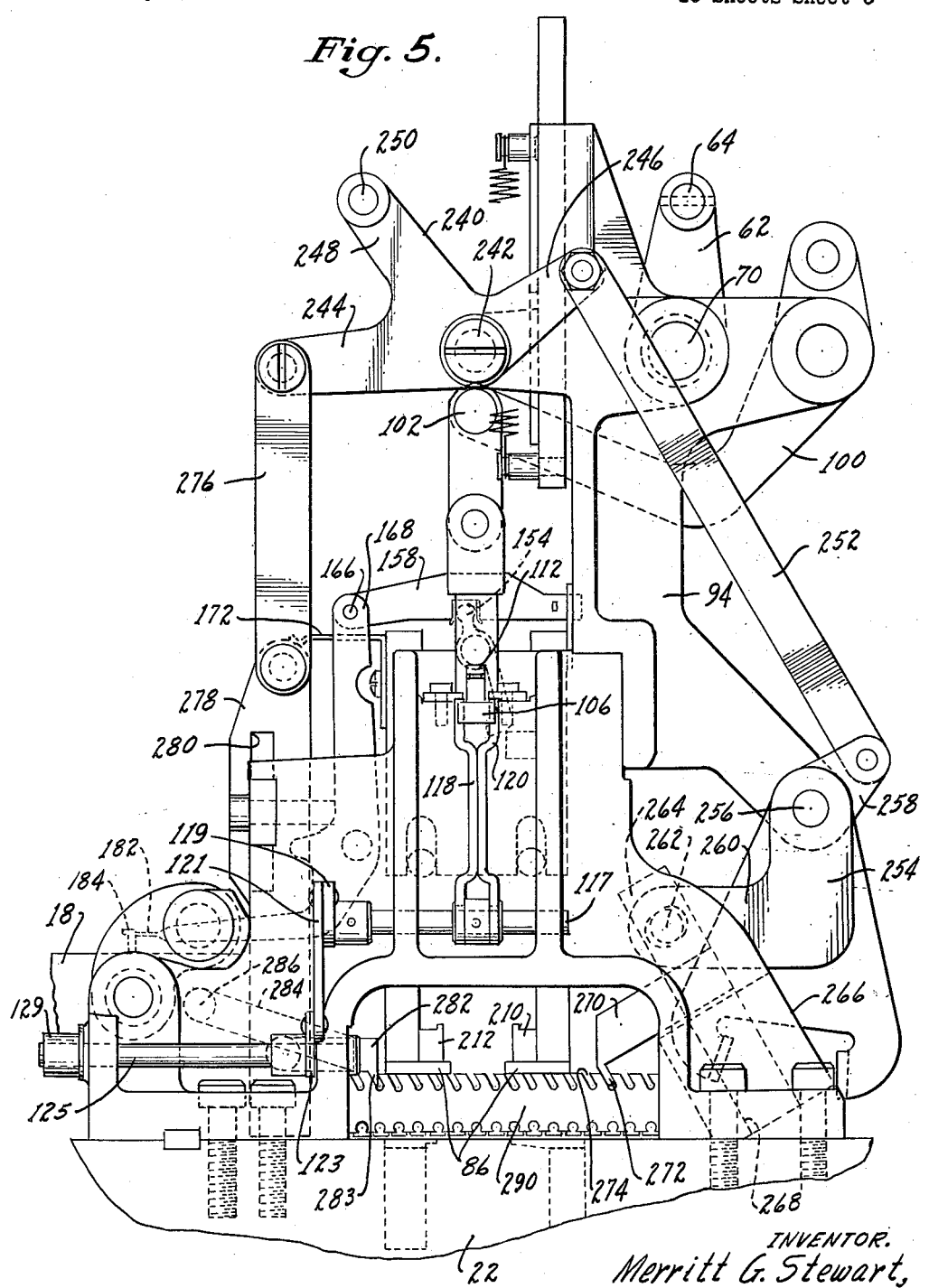
Figure 6:
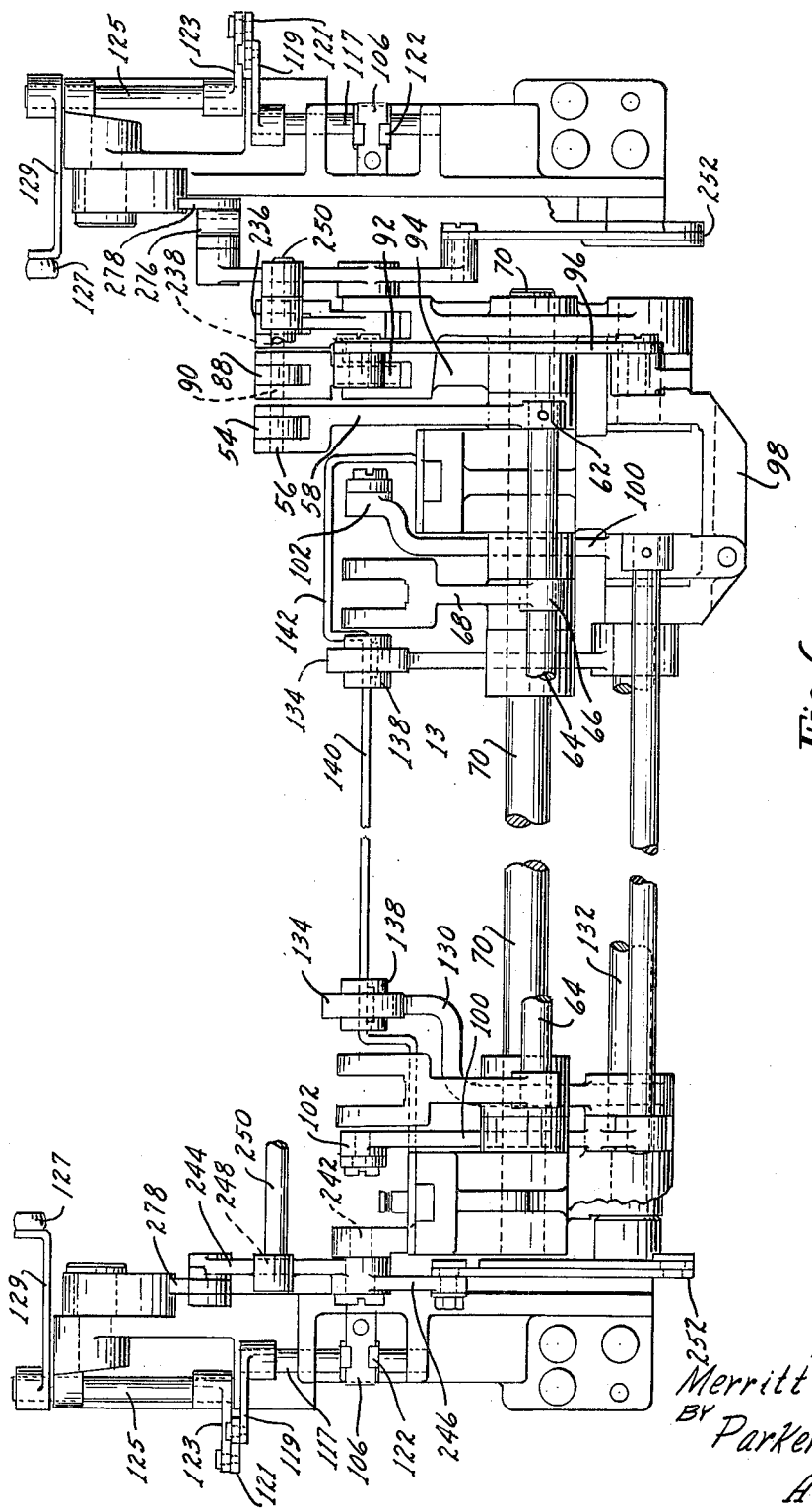
Figure 7:
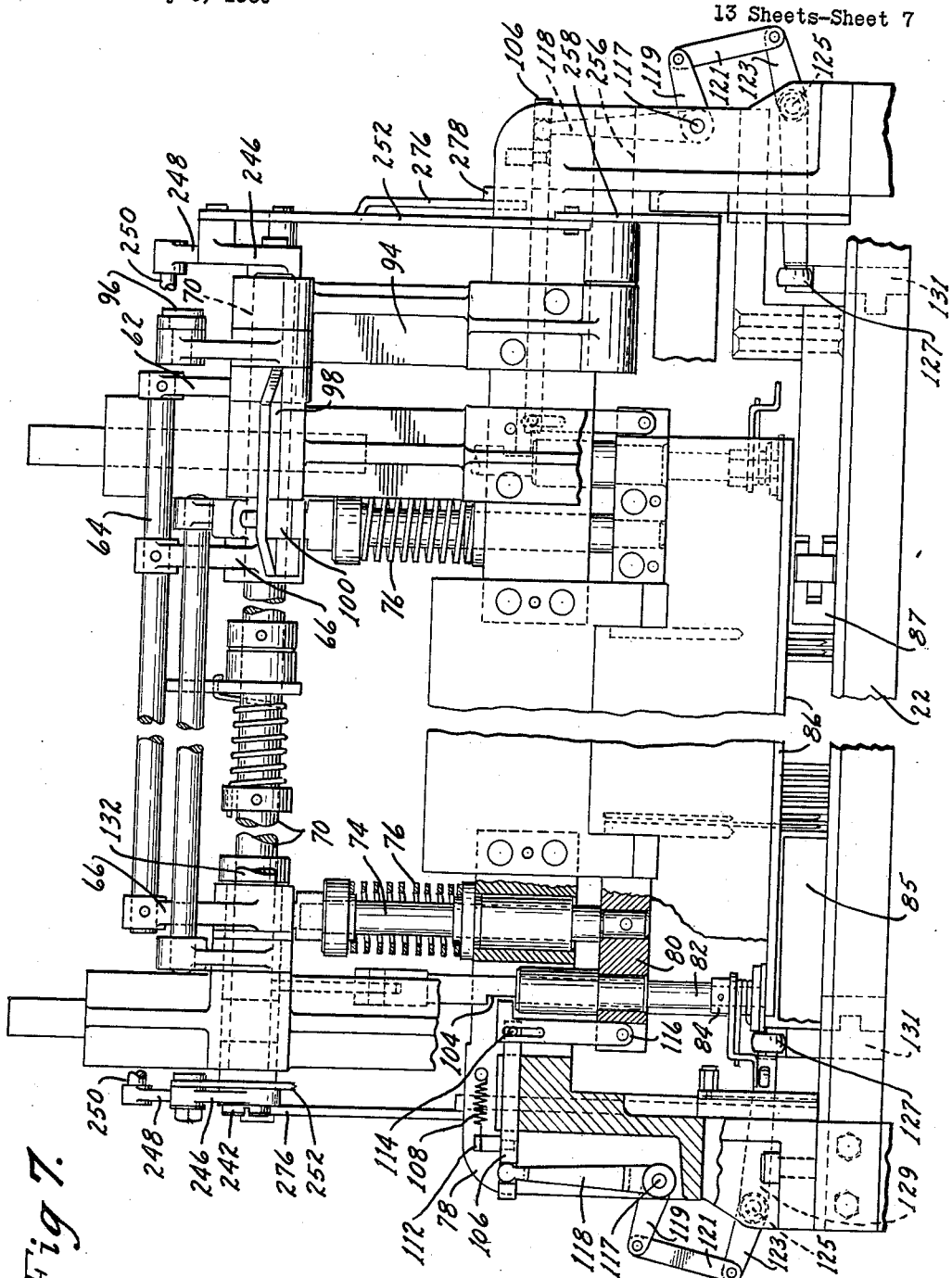
Figure 8:
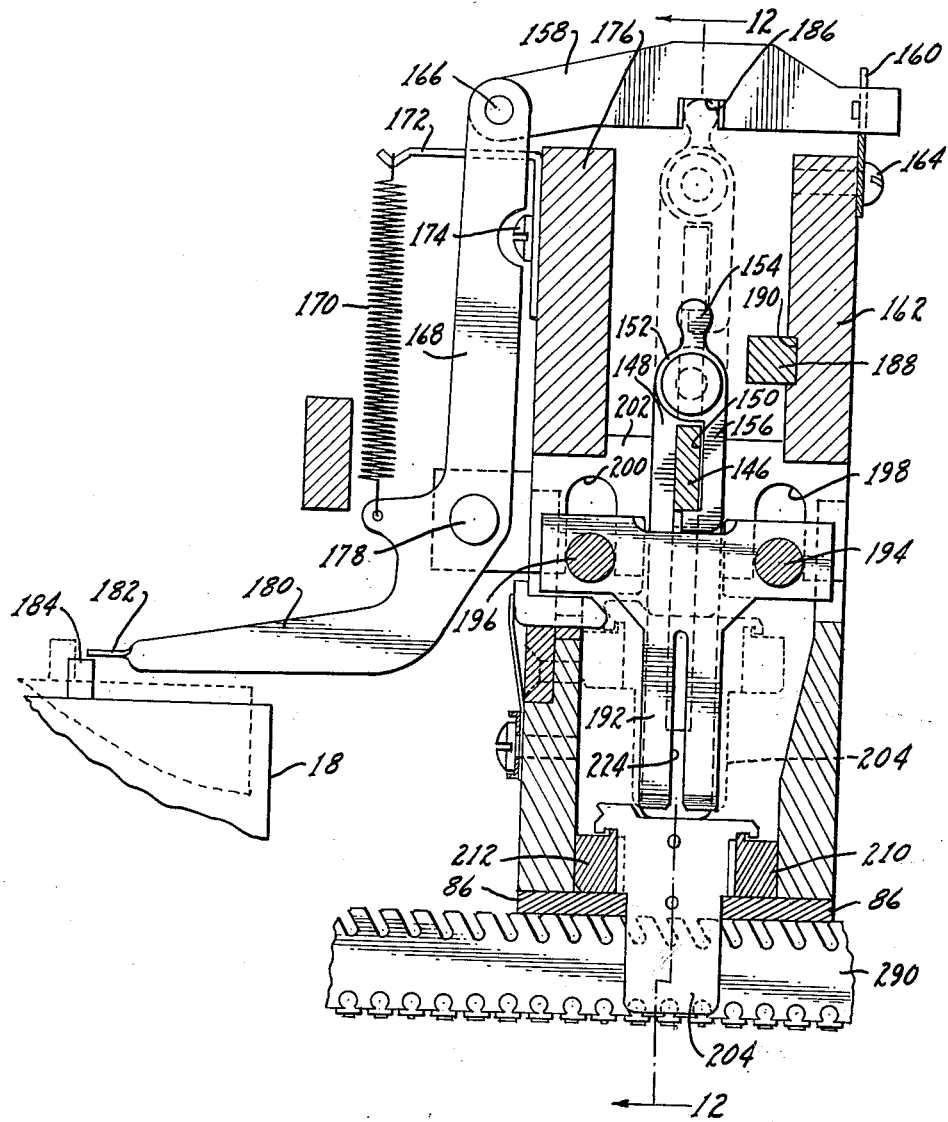
Figure 9:
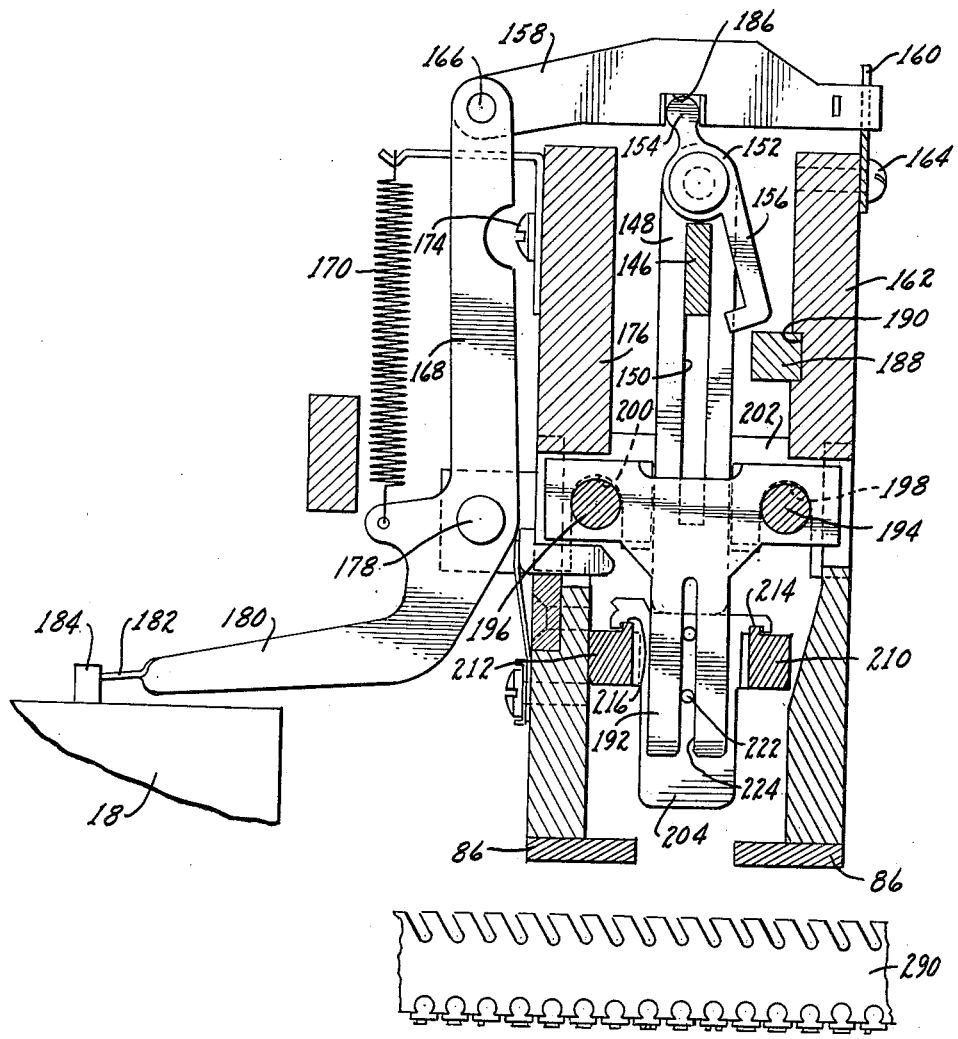

The invention is illustrated diagrammatically in the following drawings wherein:

FIGURE 1 is a diagrammatic side view of a composing machine of the type described, FIGURE 2 is a plan view of the driving mechanism for the pressure head and justifiers, FIGURE 3 is a perspective, from the left side, of the pressure head drive, FIGURE 4 is a perspective, from the left, showing the right side of the pressure head drive, FIGURE 5 is a side elevation, from the right side, of the pressure head, FIGURE 6 is a top plan view of the pressure head drive assembly, FIGURE 7 is a rear view of the pressure head drive assembly, FIGURE 8 is a side sectional view of the pressure head in the down position, FIGURE 9 is a side view of the pressure head in the up position, FIGURE 10 is an enlarged perspective of the justifier twisting means, FIGURE 11 is an enlarged perspective of a justifier.

Figure 12:
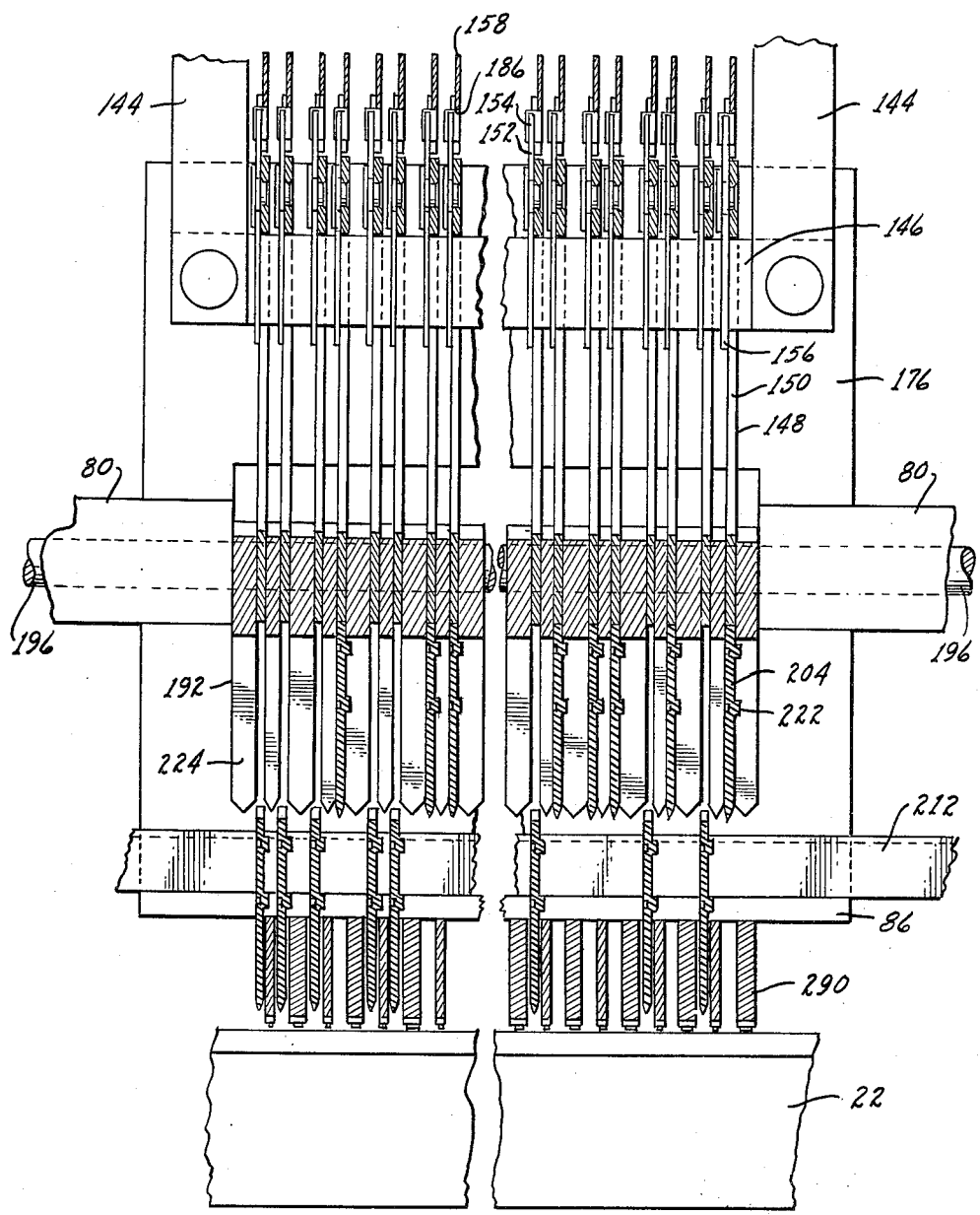

FIGURE 12 is an enlarged section showing the justifiers in a down position, taken along plane 12—12 in FIGURE 8, FIGURE 13 is a top plan view of the improved type bar used herein, FIGURE 14 is a side view of the type bar shown in FIGURE 13, FIGURE 15 is a partial side view of another type bar, FIGURE 16 is a partial side view showing a further form of type bar used herein, FIGURE 17 is a bottom view of the type bar of FIGURE 16, FIGURE 18 is a side view of a further form of type bar used herein, FIGURE 19 is a partial top plan view of the type bar of FIGURE 18, FIGURE 20 is a top plan view of a group of type bars, FIGURE 21 is an enlarged partial side view of a further form of type bar, and FIGURE 22 is a section along plane 22—22 of FIGURE 21.

Prior United States Patents 2,243,875, 2,659,299 and 2,703,715, issued to Chester A. Macomic, disclosed a composing machine of the type shown and described in this application. The present application relates to improvements on said composing machine and in particular relates to a justifying means and an improved type bar. Additionally, this invention relates to a pressure head drive for utilizing the improved justifiers disclosed herein. The operation of the composing machine will not be described in detail as it is covered in said prior patents.

Turning now to the drawings in FIGURE 1, the composing machine includes a typewriter 10 suitably mounted on a frame 12 for convenient operation. A group of toothed rotating bars, which may be termed the shutter, is indicated at 14 and may be actuated by depressing the keys on the typewriter. The details of this operation are illustrated in United States Letters Patent 2,659,299. A plunger carriage 16, mounted parallel to and below the shutter 14, is adapted to move in consonance with movement of the typewriter carriage and contains plungers adapted to be longitudinally displaced by the rotating bars in the shutter. A stop bed or pattern bed 18 is positioned parallel to and below the carriage and shutter and contains stops which are projected into the path of type bars 20 to properly position the character on each bar for printing the line that has been typed. The type bars may rest on a type bar bed 22 when they are in the down position, such as shown in FIGURE 1.

Positioned in parallel alignment with the type bars 20 is a type bar magazine 24 which holds the type bars until they are simultaneously brought down for printing a typed line. Positioned to the right of the type bar magazine 24, as shown in FIGURE 1, is a pressure head 26 which controls the operation of the justifying means described hereinafter. Positioned below the type bar magazine and to the left of the typewriter 10 is a wheel 28 having three cams 30 circumferentially and axially spaced on the outer periphery. The wheel 28 may be driven by a suitable motor or the like which operates the composing machine. Rotation of the wheel is adapted to control the operation of the pressure head as will be described later.

The details of the connection between the wheel 28 and the pressure head are shown in FIGURE 2. A roller 32 is carried by an arm 34 in such a manner that the roller rides around the outer periphery of the wheel 28 as it rotates. There is an arm and roller for each of the three cams, but the operation of only one will be described. The arm 34 is pivoted at 36 on a suitable bracket 38 mounted on the type bar bed 22. The arm 34 has a small ear 40 pivotally connected to a rod 42 which in turn is pivotally connected to a lever 44 by a pin and slot connection 46. The lever 44 may be pivotally mounted on a bracket 48 which in turn is mounted on the type bar bed 22 and may have an offset portion which supports the pin and slot connection 46. The opposite end of the lever 44 is pivotally mounted at 50 to a flat link 52. When the roller 32 strikes the cam 30 on the surface of the counterclockwise rotating wheel 28, the arm 34 is rotated in a clockwise direction about pivot point 36. Clockwise rotation of the arm 34 moves rod 42 in a downward direction and, once the pin moving in the pin and slot connection 46 has moved through the slot and taken up the lost motion provided by this connection, the rod 42 will cause lever 44 to rotate in a counterclockwise direction. Rotation of lever 44 in a counterclockwise direction moves flat link 52 downward and to the left as shown in FIGURE 2.

It should be explained that whereas the operation of the wheel 28 and the consequent movement of one flat link 52 has been described in detail, there are three links, closely positioned together, each of which is operated by one of the cams 30. The cams 30 are not positioned at the same point on the periphery of the wheel but are spaced at predetermined points to cause operation of each of the links 52 at specified timed intervals.

A wheel 29 having a cam 31 is mounted rotatably on a camshaft in the transmission (not shown). A lever 33 having a roller 35 intermediate the ends is positioned adjacent the wheel 29 so that the roller rides around the outer surface in a position to be contacted by the cam 31. The lever 33 is pivoted at 37 and biased in a clockwise direction by a spring 39 mounted on the frame. The opposite end of lever 33 is pivotally connected through a rod 41 to lever 44. When the cam 31 contacts the roller 35, rod 41 will be moved up and to the right to pivot lever 44 counterclockwise. The cam on wheel 29 is positioned to drop the pressure head down after it has been dropped to an intermediate point by one of the three cams on wheel 28.

To explain in a general way the operation of the composing machine shown herein, the operator depresses the keys on the typewriter 10 in such a manner as to type out a printed line. Each key that is depressed on the typewriter will cause a stop on the pattern bed to drop down into the path of the type bars 20. This operation is disclosed in the prior patents listed above. When the space bar is hit a justifying mechanism, hereinafter described, is actuated rather than a type bar. After a line has been completely typed, the type bars come down from the magazine and are positioned against the stops on the pattern bed so that the bars are properly positioned to type the particular line of characters desired. It is during the movement of the type bars from the type bar magazine that the pressure head is operated. The pressure head is operated through the rotating wheels 28 and 29 which are driven by any suitable drive mechanism. The pressure head, in effect, inserts a justifier between the type bars to properly position the printed line. Once the type bars are in the down position against the stops on the pattern bed and the justifiers have been placed in their proper position and moved in such a manner that the line is properly spaced, then the printing and inking mechanism, not shown herein and not a part of this application, comes up against the line of type bars for printing. In the alternative, the type bars may cast a line of printed type. Once the printing operation or casting operation, as the case may be, is completed, the pressure head rises moving the justifiers from between the type bars and the type bars are pushed back into the type bar magazine.

Having described in a general way the operation of a composing machine, I will now describe in detail the operation of the pressure head and justifiers.

In FIGURE 3, a link 54 which is the same as the flat links designated by the numeral 52 in FIGURE 2, is pivotally connected at 56 to an L-shaped lever 58 which in turn is pivoted about shaft 70. The upstanding portion 62 of the arm 58 contains a tie rod 64 which passes through an upstanding portion 66 of another L-shaped lever arm 68. The arm 68 is pivoted on the shaft 70. As each side of the pressure head is identical except for the driving links 52, I have given the same numeral to the corresponding parts of the pressure head shown in FIGURES 3 and 4. FIGURE 3 shows the left hand side and FIGURE 4 shows the right hand side of the pressure head. The lever arms 68 are each pivotally connected at 72 to a pressure head drive rod 74. A heavy spring 76 is coiled around the pressure head drive rod 74 and normally biases the drive to the up position. The lower portion of the spring 76 seats against a base or frame member 78.

The pressure head drive rod 74 slidably extends down through the member 78, as shown on the left side of FIGURE 7, and is secured to a bar 80. On the outside of the pressure head drivers 74 are rods 82 which extend slidably through the bar 80 and are secured to hubs 84 at their lower ends. This construction is clearly shown in FIGURE 10. Two spaced plates 86 form the bottom of the pressure head and in the down position are seated on top of the type bars. This is clearly shown in FIGURES 5 and 7. Positioned beneath the plates 86 and in alignment with the type bars are a ram 85 and a ram stop 87. The ram is adapted to move across the bottom of the pressure head and squeeze the type bars together to form a line of the proper length.

To summarize the operation of link 54, downward movement of this link causes each of the two pressure head drivers to move against the action of the springs 76 and to move the plates forming the bottom of the pressure head down on top of the type bars. The pressure head moves down as the type bars come out of the type bar magazine and are being properly positioned against the stops on the pattern bed. Rotation of the two wheels 28 and 29 move link 54 downward. Wheel 28 moves the pressure head to an intermediate position which places the head a given distance above the type bars to permit the tail of the non-selected bars to pass. Wheel 29 and its cam then take over and move the pressure head down on top of the bars.

Returning again to FIGURE 3, the operation of link 88, one of the three flat links illustrated in FIGURE 2 by numeral 52 will be described. Link 88 controls the justifying mechanism drive. Link 88 is pivotally mounted at 90 to a crank 92 which in turn is pivotally mounted upon a support 94 extending upward above the pressure head. The top of the crank 92 is connected through a link 96 to a yoke 98, clearly shown in FIGURE 6. The yoke is effective to move a crank 100 which is pivotally mounted on rod 82, at 102. In other words, downward movement of link 88 causes clockwise rotation of crank 92 and in turn clockwise rotation of yoke 98. Rotation of the yoke causes a clockwise rotation of crank 100 which in turn forces the rod 82 downward. Rod 82 has a notch 104, also illustrated in FIGURE 7. A bar 106 is yieldingly urged toward notch 104 by a spring 108 fastened to the frame 78 by a cross rod 110 and secured at the other end to an upstanding pin 112 in the bar 106. The bar 106 is slidably mounted through a pin and slot connection 114 to a small upstanding latch 116 pinned to the bar 80. The opposite end of the bar 106 is held in a somewhat horizontal position by means of a lever 118 having a yoke 120 received within slots 122 on either side of the bar 106.

The lever 118 is pinned to a shaft 117. A small lever 119 is pinned to the shaft 117 at one end and is pivotally connected to a link 121 at the other end. The link 121 is pivotally connected to a lower lever 123 which is pinned to a lower shaft 125. A roller 127 is mounted on a release arm 129 which in turn is pinned to shaft 125. The pull bar which moves the type bars back into the type bar magazine after a line has been printed, has a cam 131 which strikes the roller 127 as the pull bar moves upward, thus rotating the linkage 118, 119, 121, 123 and 129 in a counter-clockwise direction, as shown in FIGURE 7, to move bar 106 out of notch 104. When bar 106 moves out of the notch, springs 76 snap the pressure head and justifiers hereinafter described back into the up position.

The bar 106 in cooperation with the notch 104 holds the rods 82 in a down position once the bar has entered the notch.

When the yoke 98 moves in a clockwise direction because of downward movement of link 88, a crank 130 mounted on a shaft 132 extending outwardly from the crank 100, will also move in a clockwise direction. The crank 130 goes under the shaft 70 then comes up and has a small yoke 134 at the end thereof. The yoke 134 is pivotally mounted at 136 between two upstanding lugs 138 secured to a crossbar 140. The crossbar 140 extends across the pressure head and has a U-shaped portion 142 at each end. Adjacent each end of the crossbar 140 and close to the U-shaped portion 142 are straps 144 which connect the crossbar 140 with a second lower crossbar 146. The crossbars 140 and 146 are spaced apart and parallel and the lower bar 146 has a justifier driver 148, one for each justifier, slidably mounted thereon. Each justifier driver 148 has a generally central slot 150 through which the crossbar 146 is mounted. At this point it is well to explain that there is one less justifier than there are type bars and each of the justifiers are spaced between adjacent type bars so that there may be a space in the line of print after any character.

Each justifier driver 148 has a latch 152 pivotally mounted thereon (see FIGURE 8). Each latch 152 comprises a ball-like projection 154 at the top and a somewhat L-shaped latch 156 at the bottom. The latch 156 holds the justifier driver to the crossbar 46 and is only swung out of the way for downward movement of the crossbar if the justifier has not been selected.

A justifier latch 158 is positioned above each justifier driver, one justifier latch for each driver. At the rear end, as shown in FIGURE 8, the justifier latches 158 are supported by a plate 160 suitably grooved to receive each justifier latch and which is mounted on upper frame 162 by suitable screws 164. The front end of each justifier latch 158 is pinned at 166 to a justifier trip lever 168. Each justifier trip lever is held in an outward position by means of a spring 170 fastened at the lower end to a lever 168 and fastened at the top to a hook 172 suitably secured by means of a screw 174 to upper frame section 176 opposite and parallel to the frame section 162. Each justifier trip lever is pivotally mounted on a rod 178 and has a horizontal arm extension 180 with a lug 182 at the end thereof. As can be clearly seen in FIGURE 8, the pattern bed 18 is positioned below the horizontal arm portion 180. Each of the lugs 182 is adjacent the upper row of stops 184 on the pattern bed. The full lines of the pattern bed and stop in FIGURE 8 indicate the down position of the pattern bed, whereas the dotted lines indicate the up position. The pattern bed rotates and moves down and to the right, as shown in FIGURE 8, when moving to the down position. FIGURE 8 shows a selected justifier stop, and FIGURE 9 shows a nonselected justifier stop. In other words, when the space bar is hit, the particular stop in the last or upper row of stops designated by the numeral 184, will drop down so that the pattern bed will slide under the justifier trip lever (see FIGURE 8).

The right hand side of FIGURE 8 indicates the normal latched position of the justifiers in dotted lines. If a justifier has not been selected, a justifier trip lever will strike one of the last row of stops indicated at 184 as the pattern bed moves down. The justifier trip lever will be rotated in a downward direction, against the action of the spring 170. The ball-like projection 154 is rotated in notch 186, as shown in FIGURE 9, thus disengaging hook 156 from crossbar 146. Downward movement of crossbar 146 results from downward movement of link 88 as described above.

When the pattern bed moves down and to the right, during the operation of the composing machine, if the justifier has not been selected, the justifier trip lever will be moved to the right about pivot point or rod 178 thereby moving the justifier latch 158 to the left. This in turn moves the L-shaped hook 156, which is controlled by the ball-like projection positioned in the notch 186 in the justifier latch, to the right to disengage from crossbar 146. The non-selected position of the justifier is shown in FIGURE 9. The lug 182 on the end of the justifier trip lever 168 is contacted by stop 184, thus moving hook 156 out of the path of the crossbar 146. A small crossbar 188 is received within a slot or groove 190 in upper frame 162 to stop the L-shaped hook 156 from downward movement when the crossbar 146 goes down.

Positioned below and on both sides of each justifier driver 148 are justifier separators 192. Each of the justifier separators 192 resemble a T with the outer portions of the top of each T mounted on two rods 194 and 196. Spacers 202, having slots 198 and 200 which receive rods 194 and 196 respectively, are positioned between the justifier separators and in alignment with the justifier. The ends of the justifier separator support rods 194 and 196 are each positioned in the bars 80 at opposite ends of the pressure head and are raised and lowered with said bars. In other words, when the lower portion of the pressure head comes down to seat upon the type bars, such as shown in FIGURE 8, the justifier separators are also moved down. Whereas when the pressure head is in the up position, such as shown in FIGURE 9, the rods 194 and 196 are up adjacent the top of slots 198 and 200. The justifier separators are released for upward movement when bar 106 is pulled out of notch 104 in rods 82.

Positioned below the justifier separators 192 are the justifiers 204 which are shown in detail in FIGURE 11. The justifiers are small thin metal plates, generally rectangular in form, and having projections from either side of the top. The justifiers, when selected, are adapted to fit down between each of the type bars to form the space between the words on a printed line. In the operation of the pressure head and justifier means, when a justifier has been selected it is dropped down into space between groups of type bars forming a word on either side of the justifier. Then the ram 85 comes across to squeeze the type bars together to form a printed line of proper length. The justifiers are twisted between type bars so that there will be an equal space between each of the words in a printed line. In the down position, such as shown in FIGURE 8, the justifiers project down in between the type bars and the upper portion of each justifier is seated upon a twisting bar. A top rear portion 206 of each justifier 204 is curved as is the top front portion 208. The curved portions 206 and 208 are in contact with justifier twisting bars 210 and 212. The justifier twisting bars 210 and 212 each have carriers 214 and 216 which extend the length of the upper inner surface and project into notches 218 and 220 formed on the lower surface of the upper portion of the justifiers. Thus, the justifiers are seated upon the justifier twisting bars with the curved portions in contact with the bars and curved in the direction of movement of the justifier.

Each justifier has a pair of small pins or projections 222 which are adapted to ride a slot 224 in each justifier separator. The pin and slot arrangement maintains the justifiers in proper alignment.

FIGURE 10 illustrates the means for moving the justifier twisting bars. The justifier twisting bars 210 and 212 are each pinned or securely fastened to a justifier actuating lever 226. There are two such levers, one on either side of the pressure head. Hub 84 has a cylindrical portion 228 which may be pinned to rod 82 and has a somewhat flat arm portion 230 to which is connected one end of a torsion spring 232. The torsion spring 232 is wound around the lower portion of rod 82 and has its opposite end received within a small hole 234 in the lever 226. The arm 230 has a downwardly bent portion 227 with a roller 229 at the opposite end. The roller moves in a path 231 formed in a plate 233 which is fastened on top of the ram 85. Note that the path or slot 231 has a slanted portion 235. When the plate 233 and ram move to the right, as shown in FIGURE 10, the plate will slide underneath the pressure head and the slanted portions of slot 231 will have a camming action and cause the hub to rotate and twist the bars through the torsion spring. The bars are forced or moved in the direction of the arrows shown in FIGURE 10. Thus, the justifiers when positioned between the two justifier twisting bars tend to be twisted in a direction to extend or spread out the line of type. However, as the ram which compresses the type bars or squeezes them together comes across and forces all of the type bars together, the spaces between each word made by the justifiers will all be equal and, will in effect, spread out the words so that each line of type will be of a proper length, which has been predetermined.

To summarize the operation as thus far described, when a particular justifier has been selected by depressing the space bar of the typewriter, the movement of the pattern bed toward the justifier trip levers will result in the line of stops 184 sliding underneath the justifier trip levers associated with justifiers having been selected. Thus, when the link 88 moves downward and through the present head assembly described above causes downward movement of crossbar 146, a justifier driver which is also moved down by the crossbar will move each individual justifier down from between the justifier separators and to a position between the type bars, such as shown in FIGURE 8. When a justifier has not been selected, the justifier trip lever will be contacted by the stops on the pattern bed when the pattern bed moves down and toward the trip lever. Thus, the crossbar 146 moves down once the latch hook 156 has been swung out of the way by the justifier trip lever but the justifier driver does not. The crossbar will not carry down that particular justifier driver and so no justifier will be forced down between the type bars at that particular position.

Upward movement of the plates 86 forming the bottom of the pressure head and also the justifier twisting bars, justifiers and associated mechanism is accomplished after bar 106 is moved out of slot 104 in the rods 82. Once the bar no longer impedes the upward movement of rods 82 the springs 76 are free to move the pressure head drivers 74 to the up position out of contact with the type bars.

Returning now to FIGURE 3 and the third of the three links controlled by operation of the wheel 28, link 236 is connected at pivot point 238 to a crank 240, pivoted at 242. The crank 240 has a front arm 244 and a rear arm 246 and in addition has a forwardly and upwardly projecting arm 248 to which a rod 250 is secured. The rod 250 runs across the pressure head and connects to a crank 240 on the opposite side of the pressure head identical to the crank on the side shown in FIGURE 3.

FIGURE 5 shows the details of the crank 240 and the means for operating the front and rear slides which are controlled thereby. The rear arm portion 246 is pivotally connected to a link 252 which in turn is pivotally connected at its opposite end to a crank 254. Crank 254, pivoted at 256, has an upwardly and rearwardly extending arm portion 258 which is pinned or pivotally connected to link 252 and a somewhat L-shaped portion 260 which is connected through a pin and slot connection 262 to a slide 264. The slide 264 is shown in dotted lines in FIGURE 5. A guide 266 having a central slot 268 formed and adapted to receive slide 264 may be mounted on the frame of the pressure head. Projecting downwardly and to the left, as shown in FIGURE 5, is a rear liner 270 which is secured to the slide and has a suitable lug 272 extending downwardly and rearwardly therefrom which is formed and adapted to be received within the somewhat angular slots 274 formed on the top of each type bar. The rear liner and lug 272 is a bar and extends completely across the rear portion of the pressure head and is adapted to fit within slots in each of the type bars to hold the bars in proper aligned position for printing.

In operation, as lever arm 236 moves downward through the action of the cams and wheel described before, crank 240 will be rotated in a counterclockwise direction as shown in FIGURE 5. This will move link 252 up and to the left as shown in FIGURE 5 and cause crank 260 to rotate in a counterclockwise direction, thus driving slide 264 down into the guide and moving lug 272 down into the slots in the top of the type bars.

Connected to the front arm portion 244 is a link 276 which in turn is connected at its opposite end to a slide 278 having a suitable slot 280.

A front liner 282 having a downwardly extending lug 283 formed and adapted to fit into the angular slots 274 on the top of the type bars, is pivotally mounted to the bottom of slide 278. An arm 284 having a roller 286 is fastened on each side of the front liner, the roller being positioned to contact a cam mounted on the pattern bed.

In operation, counterclockwise movement of crank 240 moves link 276 and slide 278 downward, thus moving the front liner 282 downward. When the pattern bed moves up pressure is exerted on the underside of roller 286 which moves the front liner down and forces lug 283 into the slots on the top of the type bars, thus providing additional means for securely holding the type bars during printing.

To summarize the operation of the pressure head and justifier thus far, after a line has been completely typed by the typewriter and the appropriate stops on the pattern bed have been selected through typing of the keys and, in addition, appropriate justifier stops have been selected in accordance with the space between words, the wheels 28 and 29 shown in FIGURES 1 and 2 are rotated by suitable drive means. As the wheels are rotated the type bars come down from the type bar magazine and are positioned against the stops selected on the pattern bed. Before the type bars come down, the pattern bed moves down to contact the justifier trip levers as explained earlier. After the type bars are in position, the pattern bed moves up and away from the type bars. The wheels 28 and 29 which are rotating cause downward movement of the links 54, 88 and 236 respectively in sequence. The link 54 moving first and the link 236 moving last. Downward movement of pressure head drivers 74 through the pressure head assembly described causes the pressure head to move down upon the type bars so that the plates 86 are positioned on top of a group of type bars. Thus, in effect, the plates 86 form the top or one side of a box which encloses the type bars.

Downward movement of link 88 moves rods 82 and the justifiers down between the plates 86 on the bottom of the pressure head. The selected justifiers are driven down in between the type bars to form the spaces between words. The justifier twisting mechanism twists the justifiers against the action of the ram which squeezes the type bars together. The justifiers are twisted so that the space between each word is equal and so that the line is of a predetermined length.

Downward movement of lever arm 236 causes each of the liners, the front and rear liner, to move down into the angular grooves or slots in the top of each type bar to properly hold the type bar in position for inking and printing.

Once the justifiers and type bars are positioned the lower face of the type bar upon which the characters are cast is inked, and the line is printed. In the alternative, the type instead of being cast convex such as shown herein may be concave so that instead of printing a line of type, a line of type may be cast to use in a printing machine.

FIGURE 13 illustrates a tapered type bar such as used in the composing machine described herein. The bar 290 is tapered from the head or thick end 292 to a thinner or tail end 294. One longitudinal edge of the type bar, the bottom edge as shown herein, has a series of equally spaced slots 296 in which individual type characters 298 may be cast. As shown herein the type characters are convex so that the machine prints on paper, whereas in the alternative the characters may be concave so that a line of type may be cast from the grouped type bars. The top of each of the type bars have a series of somewhat angular slots 274 which were described in conjunction with the liners forming a part of the pressure head and justifier mechanism.

The head end 292 of the type bar illustrated in FIGURES 13 and 14 may have an upstanding rectangular portion 302 with a central slot 304 and a wing 306 positioned therein. As shown in FIGURE 14 the wing is on the upper inside of the slot 304, however the position of the wing will vary and preferably is staggered. Note FIGURE 15 wherein the wing 306 is on the bottom outside portion of slot 304. As clearly shown in FIGURE 20 the wing elements are effective to separate the head end of each of the type bars and keep the bars in alignment and to conform to channels in bottom of pattern bed.

That portion of the head end 292 of each type bar adjacent to the upstanding rectangular portion 302 may be cut away to form somewhat rectangular grooves or slots 308, one on each side of the type bar. The fork on the pull bar, not shown herein, engages these surfaces.

Adjacent the head end of each type bar, whether it be a type bar with the head end thin or thick, are two aligners 310, one on each side of the type bar. The aligners are staggered vertically, as indicated in FIGURE 22 so that adjacent aligners interfit in such a way that the type bars may be closely held together. The aligners are effective to return the justifiers to their normal position as the type bars move back into the type bar magazine. The lower portion of each justifier is contacted by the aligners as the type bars move into the magazine, thus repositioning the justifiers into their proper location, so they may be elevated back into the spaces between the justifier separators.

As shown in FIGURE 20, the type bars are preferably assembled in a staggered fashion so that the thin end of one bar is between the thick end of the adjacent two type bars. Looking at the head end of each of the type bars in FIGURE 20, note that the wings 306 are staggered longitudinally. These same wings are also staggered vertically as indicated by FIGURES 14 and 15. Also note in FIGURE 20 that the aligners are staggered vertically so that adjacent aligners will mesh together.

The head end of those type bars which are thinner at the head end may have a wear plate 312 positioned to contact the outer tip of the wings on each side. This is clearly shown in FIGURES 18 and 19. The wear plate 312 is preferably slightly wider than the total width of the head end of the type bar thus providing uniform spacing for the type bars at both the head and tail ends. Note that all type bars have aligners at the head end whether they be a type bar with a thin or thick end for the head end.

Turning now to the tail end of each of the type bars, those type bars having a thick tail end include a small lug 314 having an open slot 316 mounting a wing 318. The lug and wing structure may be mounted at the extreme end of the tail end of the type bar, such as shown in FIGURES 16 and 17, or it may be mounted at a point spaced from the extreme end such as shown in FIGURE 18. The wing position is staggered such as the wing position at the head end. The tail end of those type bars not having a wing have a small wear plate 320 positioned on top of the bar and in alignment with the wings for contact therewith. The wear plates 320 serve the same purpose as the wear plates 312 and again are slightly greater in width than the width of the thin tail end of the type bars.

As can be seen from the above description of the type bars the wing and wear plate and aligner arrangement provides a unique interfitting type bar arrangement which cooperates effectively with the justifiers to provide a properly dimensioned and spaced line of type. As certain letters and characters of the alphabet are thicker than others, the thicker letters such as upper case W are positioned at the thick end of the type bar whereas the period or i are positioned at the thin end of the type bars. The various letters of the alphabet and other characters used on a typewriter are positioned between these two extremes at a point on the type bar corresponding to the thickness or set dimension of the particular character. The thick end of each type bar has a wing, whether it be at the head end or the tail end, whereas the thin end of each type bar has a wear plate positioned to contact the wings of the adjacent type bars. The wings of adjacent type bars are preferably staggered at both the tail end and head ends so that there is no danger of the two wings contacting each other. The type bars are arranged, such as shown in FIGURE 20, with the thin head of one type bar adjacent the thick head end of an adjacent type bar with the wing of the thick end bearing against the wear plate of the thin end. This staggered relationship is continued throughout the head end and tail end of the type bars.

The use, operation and function of the invention are as follows:

In the operation of a composing machine such as that shown herein, once the operator has typed a particular line to position the stops on the pattern bed and to select the justifiers for spaces between words, the operator pushes the starting lever. During the time when the operator is typing the line, the ram is being set to provide sufficient space between the ram stop and the ram for the particular length of line being typed.

After the operator presses the start key, the power unit is effective to drop the pattern bed down so that the selected stops are positioned to properly position the type bars coming down from the magazine. Once the pattern bed is down the type bars come down from the magazine and are positioned against the stops. As the type bars come down the pressure head is also coming down toward the type bars. The pressure head has an intermediate position or first position which permits sufficient clearance for the non-selected type bars to pass underneath. When the type bars are going down, the non-selected bars are actually down beyond the pressure head but this intermediate position is necessary when the type bars are returned to the magazine after a line has been printed, to eliminate interference by permitting the heads of all type bars to pass under the pressure head so the justifiers may be restored to their proper locations before the pressure head and justifiers complete their cycle of operation. The pressure head is moved to the intermediate position by downward movement of link 54 which was described earlier. The pressure head stays in the intermediate position for perhaps a second and a half until the heads have cleared the front of the pressure head, after which it is moved down the rest of the way, again by link 54, until the plates 86 seat upon the top of the type bars.

The three links which have been designated as operating the pressure head operate in very close sequence. As the pressure head is moving down, the selected justifiers move down into the space between the type bars and the liners move down to hold the type bars. By the time the pressure head is down and seated upon the top of the type bars the liners are in position and the justifiers have been dropped down between the bars. At this point in the cycle the pattern bed rises to permit sliding the type bars sidewise for grouping.

Now the ram comes across and squeezes the type bars and selected justifiers to form a line of proper length. The ram pushes the type bars and the justifiers against the ram stop. The movement of the ram additionally causes the justifier twisting mechanism to twist and properly position the justifiers.

Next the inking mechanism comes over and inks the type on the bottom face of the type bars. The inking mechanism moves across the face of the bars then stops or rests at the far side of the machine. Next the printing mechanism comes up and the paper is pressed against the inked face of the type bars to print the line. The printing mechanism and the paper move away from the squeezed line of type bars. As the paper is moved away it is advanced a predetermined distance so that the next line will be properly spaced on the printed page. The printing mechanism and inking mechanism have not been shown herein as this invention is mainly concerned with the justifying means and the improved type bars.

As the ram moves away from the squeezed bars constituting the line of type, the pressure head is moving to the intermediate position which will permit the tail end of the type bar to pass underneath. Now the pull bar down at the bottom of the composing machine (not shown) starts up and brings the non-selected type bars as well as selected type bars and moves them upward into the type bar magazine. As the type bars move back into the magazine the aligners on each individual type bar will properly position and align the justifiers so that they may be snapped back up between the justifier separators. The wings on each of the type bars are effective to properly align and position adjacent type bars.

As was described earlier as the pull bar comes up it is effective to release bar 106 from the notch 104 and thereby release the rods 82 which had been holding the justifiers down. This permits the justifiers to snap back up into the space between the justifier separators. Once the justifiers are back into position and the type bars are properly positioned in the type bar magazine the operating cycle is completed and the machine is ready for the next line of type.

Of particular importance in this invention are the justifiers and the means for both selecting the justifier and twisting the justifier to properly position or space the words in a particular line. Each individual justifier is dropped down in the space between type bars forming the end of one word and the beginning of the next. The torsion springs and the movement of the ram are effective to move the justifier twisting bars in such a manner that the justifiers will be twisted and thereby increase the space between adjacent words so that the line has proper length.

Near the end of the operating cycle each individual selected justifier, is properly aligned to snap back up into the space between the justifier separators by the aligners that project out from each side of the type bars.

The type bars are also important in the invention as they provide both a means for aligning the justifiers and for properly positioning the type bars themselves as they move back into the type bar magazine.

Whereas the preferred form of the invention has been shown and described herein, it should be realized that there are many modifications, substitutions and alterations thereto within the scope of the following claims.

I claim:

1. A composing machine including a magazine of character strips each including a plurality of aligned characters, a justifying means including a magazine of individual justifier members, means for selecting characters on said character strips and means for moving said strips longitudinally to a position of use, means for selecting justifier members, said justifying means further including means for positioning justifiers, when selected, between adjacent character strips, means for twisting said justifiers when positioned between said adjacent strips to increase the space therebetween, means for moving said character strips back into said magazine after use, and means, activated by the means moving the character strips back to the magazine, for removing said selected justifiers from between the character strips.

2. The structure of claim 1 further characterized in that said justifier members each have a thin somewhat rectangular portion positioned to be inserted between adjacent character strips and two oppositely directed projecting portions which overlie said justifier twisting bars.

3. The structure of claim 1 further characterized in that the means for twisting said justifier members includes a longitudinal bar positioned on each side of said justifiers and forming a support therefor, movement of said bars in opposite direction being effective to twist said justifiers.

4. The structure of claim 3 further characterized in that said justifier twisting bars move longitudinally to twist said justifier members and move in a path perpendicular to the direction of longitudinal movement when moving from an operating to an unoperating position.

5. The structure of claim 3 further characterized by at least one spring operably connected to said justifier twisting bars and biasing said bars in opposite directions.

6. The structure of claim 1 further characterized by means for squeezing said character strips and the selected justifiers together to form a compact line of type.

7. The structure of claim 6 further characterized in that said means for squeezing said character strips and selected justifiers together is also effective to twist said justifiers.

8. The structure of claim 1 further characterized by means for squeezing said character strips and selected justifiers together to form a line of type and for simultaneously twisting said justifiers to provide proper spacing between words forming the line of type.

9. A composing machine including a magazine of character strips each including a plurality of aligned characters, said strips being tapered and positioned in the magazine with the thicker end of one strip adjacent the thinner end of the adjacent strip, justifying means including a magazine of individual justifier members, means for positioning said character strips and means for selecting said justifier members, said justifying means further including means for positioning said justifiers when selected, between selected adjacent strips, means for twisting said justifiers when so positioned to increase the space between said strips and means for re-aligning the justifiers as the character strips move back into the magazine.

10. The structure of claim 9 further characterized in that said strips include means for realigning said justifiers as the strips move back into the magazine.

11. The structure of claim 9 further characterized in that said character strips include means for spacing the strips as the strips move back into the magazine.

12. A body of character carrying strips for use in a composing machine including a plurality of tapered character carrying bodies arranged with the thin end of one character body adjacent the thick end of the next character body, and means for holding said character carrying bodies in spaced parallel alignment including a wing member projecting outwardly from both sides of one end of each of said character carrying bodies the wing members being positioned on opposite ends of adjacent character carrying bodies.

13. The structure of claim 12 further characterized in that said wing members are positioned at the thick end of each of said tapered character bodies, and the thin end of each of said character bodies have a wear surface positioned to be contacted by the wing member of the adjacent character body.

14. The structure of claim 13 further characterized in that said wing members are longitudinally staggered in relation to the thick end of said character carrying bodies.

15. In a composing machine, a body of character strips including a plurality of tapered character carrying bodies positioned to move longitudinally to a printing zone and arranged with the thin end of one character body adjacent the thick end of the next character body, a body of justifier members positioned to be inserted, when selected, between adjacent character bodies at the printing zone, means for twisting said justifiers to increase the space between said character bodies, and means positioned on said characted carrying bodies for returning said justifiers to an untwisted position as said character bodies move longitudinally away from said printing zone upon completion of the printing operation and use of the character strips.

16. The structure of claim 15 further characterized in that said means for returning said justifiers to an untwisted position includes a projection extending outwardly from each side of said character carrying bodies.

17. The structure of claim 15 further characterized in that said justifiers, in the untwisted position, are generally parallel to said character carrying bodies.

18. The structure of claim 15 further characterized by means for positioning said character carrying bodies in spaced parallel alignment as said character carrying bodies move out of the printing zone.

19. The structure of claim 18 further characterized in that the means for aligning the said character carrying bodies includes a wing member projecting outwardly from the thick end of each of said character bodies.

20. A justifying means for use on a composing machine having character strips of the type described including a magazine of spaced individual justifier members positioned perpendicular to said character strips, means for positioning said justifiers, when selected, between adjacent strips, and means for twisting said justifiers to increase the space between said adjacent strips including at least one long twisting bar in alignment with the magazine of spaced justifiers and perpendicular to said strips, each of said justifiers being supported on said twisting bar, and means for removing said selected justifiers from between the character strips upon completion of the composing operation and use of the strips.

References Cited in the file of this patent

UNITED STATES PATENTS

| | | |
|---|---|---|
| 630,772 | Botz | Aug. 8, 1899 |
| 989,129 | Begener | Apr. 11, 1911 |
| 1,471,400 | Kingsbury | Oct. 23, 1923 |
| 1,895,520 | Phillips | Jan. 31, 1933 |
| 2,243,875 | Macomic | June 3, 1941 |